H. WARREN.
LAWN MOWER.
APPLICATION FILED AUG. 21, 1916.
1,225,380.
Patented May 8, 1917.
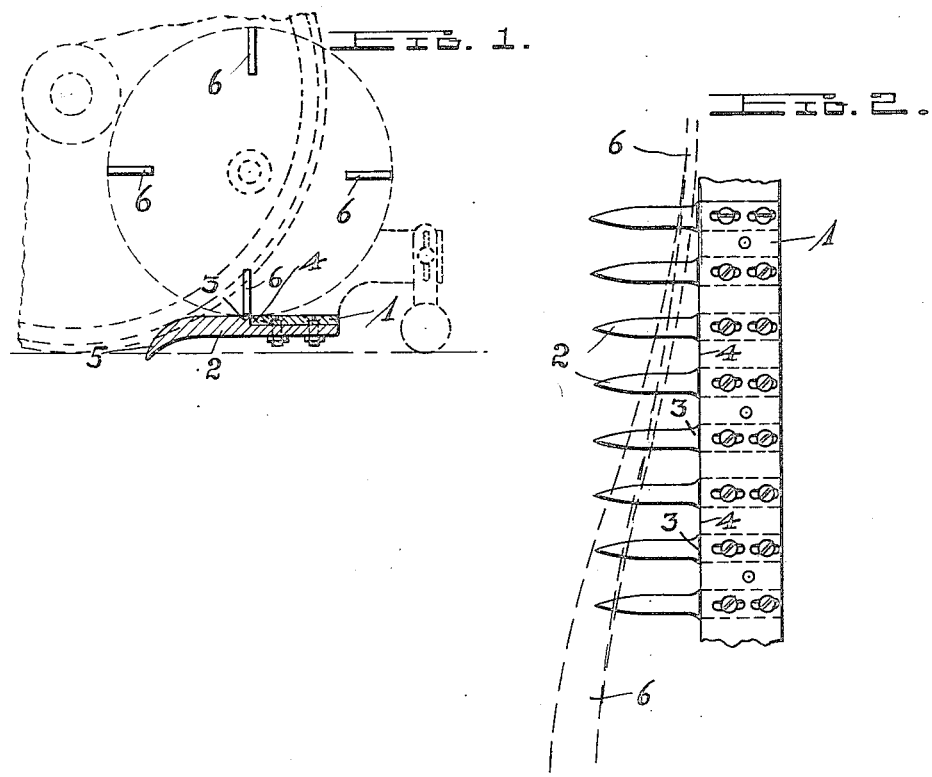

UNITED STATES PATENT OFFICE.

HOWARD WARREN, OF LOS ANGELES, CALIFORNIA.

LAWN-MOWER.

1,225,380.   Specification of Letters Patent.   Patented May 8, 1917.

Application filed August 21, 1916. Serial No. 116,034.

*To all whom it may concern:*

Be it known that I, HOWARD WARREN, a citizen of the United States, residing at Los Angeles, in the county of Los Angeles and State of California, have invented new and useful Improvements in Lawn-Mowers, of which the following is a specification.

My invention relates to improvements in lawn mowers in which rotating blades strike past a stationary cutting blade; and the objects of my improvements are, to clean the lawn while cutting it; to rake the lawn while cutting it; to clean the lawn from the weed-grass while cutting it; to provide a rake which can easily be attached to any common lawn mower; the invention consisting in the construction, combination and arrangement of devices hereafter more fully described and claimed, and illustrated in the accompanying drawing, in which—

Figure 1 is a cross section through my device with the outline of the rotating cutters of a lawn mower shown above my device.

Fig. 2 is the top view of my device.

Similar numbers refer to similar parts throughout the papers.

To the cutting blade 1 of a lawn mower, I fasten my rake tines 2, see Fig. 1. A shoulder 3 is formed on the tines to rest against the front edge 4 of the cutting blade 1. The pointed ends 5 of the tines are slightly curved pointing in a downwardly direction toward the front. The several tines attached thusly to the cutting blade 1, form, with the cutting blade, a peculiar harrow, see Fig. 2, by which the weed-grass is cleaned out of the lawn and brought between the tines against the cutting blade 1, while the rotating cutting blades, outlined at 6 in Figs. 1 and 2, are apt to grasp and cut it, throwing it into the basket usually attached to a lawn mower, not shown in the drawing.

It will easily be understood that the shape or the size of the lawn mower does not matter, as long as a cutting blade is present, to which my device can be attached.

Having thus described my invention, I claim:—

1. An attachment for the cutter bar of a lawn mower, consisting of a suitable number of tines each adjustably and removably attached to the cutter bar, the tines projecting in a forward direction from the cutter bar and pointing downwardly.

2. An attachment for the cutter bar of a lawn mower, consisting of a suitable number of tines each adjustably and removably attached to the cutter bar having a shoulder resting against the cutting edge of the cutter bar, the front ends of the tines projecting forward and with the pointed ends downwardly from the lawn mower.

In testimony whereof I hereunto affix my signature in the presence of two witnesses.

HOWARD WARREN.

Witnesses:
  OTTO H. KRUEGER,
  C. MITSCHLER.